United States Patent [19]

Lindner

[11] Patent Number: 5,621,033
[45] Date of Patent: Apr. 15, 1997

[54] POLYVINYLCHLORIDE PROCESSING AND COMPOSITIONS USING A POLYOL REACTED WITH A MONOCARBOXYLIC ACID AND A DICARBOXYLIC ACID

[76] Inventor: Robert A. Lindner, 115 Hemlock Dr., North Wales, Pa. 19454

[21] Appl. No.: 4,840

[22] Filed: Jan. 19, 1993

[51] Int. Cl.$^6$ ..................................................... C08K 5/11
[52] U.S. Cl. .............................. 524/314; 524/306; 524/567
[58] Field of Search ................................... 524/314, 311, 524/306

[56] References Cited

U.S. PATENT DOCUMENTS

| | | | |
|---|---|---|---|
| 3,578,621 | 5/1971 | Stapfer | 260/31.6 |
| 3,875,069 | 4/1975 | Worschech | 252/56 S |
| 3,951,883 | 4/1976 | Ruchlak et al. | 260/2.5 M |
| 3,981,838 | 9/1976 | Wilson . | |
| 4,072,657 | 2/1978 | Tanaka et al. | 260/47 |
| 4,102,839 | 7/1978 | Crochemore et al. | 260/23 |
| 4,336,176 | 6/1982 | Lindner | 524/310 |
| 4,338,226 | 7/1982 | Worschech et al. | 524/302 |
| 4,392,581 | 7/1983 | Itsubo et al. | 215/348 |
| 4,425,458 | 1/1984 | Lindner | 524/314 |
| 4,487,874 | 12/1984 | Lindner | 524/311 |
| 4,645,795 | 2/1987 | Hosoi et al. | 525/83 |
| 4,690,977 | 9/1987 | Hosoi et al. | 525/83 |
| 4,797,440 | 1/1989 | Schofield et al. | 524/239 |

FOREIGN PATENT DOCUMENTS

| | | |
|---|---|---|
| 529192 | 9/1976 | U.S.S.R. . |
| 817041 | 7/1959 | United Kingdom . |

*Primary Examiner*—Christopher Henderson
*Attorney, Agent, or Firm*—Forrest L. Collins

[57] ABSTRACT

This invention describes an improved lubricating system for polyvinylchloride and other plastic. In particular the present invention describes compositions having excellent metal release properties for the plastics industry.

22 Claims, No Drawings

5,621,033

POLYVINYLCHLORIDE PROCESSING AND COMPOSITIONS USING A POLYOL REACTED WITH A MONOCARBOXYLIC ACID AND A DICARBOXYLIC ACID

BACKGROUND OF THE INVENTION

1. Field of this Invention

This invention relates to polyvinylchloride products and in particular, lubricants for polyvinyl chloride products.

Polyvinylchloride articles are useful for a number of purposes ranging from highly flexible inductile materials to those which are quite rigid. This invention is particularly concerned with the manufacture of rigid polyvinylchloride articles and particular to a novel lubricant system for rigid polyvinylchloride articles.

It is generally known that polyvinylchloride will adhere to the sides of the equipment in which it is processed. Typically, polyvinylchloride is mixed with other useful ingredients including lubricants and is masticated in an extruder. Twin screw extruders are often used with the pellets of polyvinylchloride being added together with the other ingredients at one end of the extruder. The extruder, by crushing and pushing the polyvinylchloride articles together, forms a liquid melt.

The molten-state polyvinylchloride is then pushed through the extruder and eventually extruded through a die. At any point in the processing where the polyvinylchloride contacts metal the possibility of adhesion occurs. In a free-flowing process the polyvinylchloride moves through the extruder and is easily extruded through the die. However, when the process is interrupted or the flow is stopped in the extruder the possibility occurs for the polyvinylchloride to adhere. Even without the adhesion in the extruder it is possible for the polyvinylchloride to resist flow through contact with the extruder walls.

The contact of the polyvinylchloride with the extruder walls requires greater physical energy to move the polyvinylchloride through the extruder. As the extruder is typically connected to a constant rpm motor the flow of polyvinylchloride should be smooth through the extruder. If the flow of the polyvinylchloride is restricted by adhesion to the walls of the extruder the motor may become overworked. At the very least, greater energy expenditures are observed when lubrication is not properly utilized to continue the flow of the polyvinylchloride through the extruder.

There are attendant difficulties in utilizing polyvinylchloride lubricants. These difficulties involve adverse consequences to the polyvinylchloride articles. The present invention exhibits both internal and external polyvinylchloride lubricating properties. An internal lubricant for polyvinylchloride is one which assists in the movement of the molecules of polyvinylchloride over one another to ensure that an even melt is achieved in the extruder. The adverse consequences which can result from utilizing an improper internal lubricant are primarily concerned with the heat distortion caused by the flexibility of the article which in turn is caused by the lubricant.

External lubricants are those which primarily contact the walls of the extruder and of the die. The purpose of the external lubricant is to facilitate the passage of the polyvinylchloride through the extruder. Ordinarily, the external lubricant is desired to be left on the walls of the extruder or the die and that the external lubricant migrate to the surface of the finished polyvinylchloride article. It is thus possible by correctly choosing an external lubricant to have one which may be cleaned from the finished article so that the article may be painted or otherwise treated.

A lubricant which shows both internal and external lubricating properties for polyvinylchloride is highly desirable as the overall level of additives in the polyvinylchloride may be reduced through the judicious selection of the proper lubricant. First, the cost of the lubricant system for the polyvinylchloride may be reduced and as the external lubricating agents tend to migrate from the polyvinylchloride it is possible to avoid having substantial quantities of internal lubricant remain in the finished polyvinylchloride article. The polyvinylchloride articles with which the invention is concerned are clear articles such as bottles, opaque sheets, and rigid profiles of polyvinylchloride.

2. Description of the Art

Wilson, in U.S. Pat. No. 3,981,838 issued Sep. 21, 1976 describes various tri-carboxylic compounds which may be esterified and utilized in processing plastics. Wilson states that acid numbers under 2.5 are arbitrarily viewed as essentially tri-esters. Wilson further continues to state that acid numbers greater than that would correspond to a decrease in external lubricity.

Worschech in U.S. Pat. 3,875,069 describes lubricants for thermoplastic materials which are (A) mixed esters of aliphatic polyols, dicarboxylic acids and long chained aliphatic monocarboxylic acids, and (B) esters of the group of dicarboxylic acids and long chained aliphatic monofunctional alcohols; esters of long chained aliphatic monofunctional alcohols and long chained aliphatic monocarboxylic acids; and complete or partial esters of aliphatic polyols and long chained aliphatic monocarboxylic acids in a ratio of (A) to (B) of 1:3 to 9:1. The highest acid number mentioned in the Worschech '069 patent is six with the recommendation that there are no free hydroxyl or acid groups in his lubricant molecule.

In U.S. Pat. No. 4,336,176 issued Jun. 22, 1982, to Lindner, there is disclosed manufacture of polyvinylchloride compounds utilizing an organo-tin compound and a partial ester having functionality as both an internal lubricant and a co-stabilizer for the plastic. U.S. Pat. No. 4,425,458 issued Jan. 10, 1984 to Lindner describes the use of polyguerbet alcohol esters as lubricants for polycarbonate. U.S. Pat. No. 4,487,874 issued Dec. 11, 1984 to Lindner discloses polycarbonate lubricants which were formed from the partial esterification of pentaerythritol.

U.S. Pat. No. 4,690,977 to Hosoi et al, issued on Sep. 1, 1987, describes vinylchloride polymers comprising a grafted polymer, a vinylchloride polymer, a rubber copolymer, and a lubrication system which includes a wax lubricant and epoxidized soybean oil. Hosoi et al makes similar disclosures in U.S. Pat. No. 4,645,795 issued Feb. 24, 1987.

Schofield et al in U.S. Pat. No. 4,797,440 issued Jan. 10, 1989 describes a thermoplastic polymeric organic medium in the presence of a lubricant and a processing additive containing a divalent aliphatic radical. The stabilization of polyvinylchloride is taught in U.S. Pat. No. 4,338,226 issued Jul. 6, 1982 to Worschech et al. The stabilization of the vinylchloride polymers is also taught by Crochemore et al in U.S. Pat. No. 4,102,839 issued Jan. 25, 1978. U.S. Pat. No. 3,951,883 issued Apr. 20, 1976 to Ruchlak et al discloses polyvinylchloride molding compositions.

Tenaka et al in U.S. Pat. No. 4,072,657 issued Feb. 7, 1978 discloses synthetic resins which include vinylchloride-vinylacetate copolymers. U.S. Pat. No. 4,392,581 issued Jul. 12, 1983 to Itsubo et al describes vinylchloride resin compositions. U.S. Pat. No. 3,578,621 issued May 11, 1971 to Stapfer describes stearamide waxes which may be utilized for plastic processing.

This invention deals with lubricant additive systems for polyvinylchloride resins which have superior properties with to metal release and having low gloss.

Throughout the specification and claims, percentages and ratios are by weight, temperatures are in degrees Celsius, and pressures are in KPa gauge unless otherwise indicated. To the extent that any of the references cited herein are applicable, they are hereby specifically incorporated by reference. Ranges and ratios given herein may be combined.

SUMMARY OF THE INVENTION

The present invention describes a reaction product of a reaction mixture of a polyol with respect to the —OH groups and a dicarboxylic acid with respect to the carboxylic groups wherein sufficient excess dicarboxylic acid is employed to give a reaction product having free carboxylic groups and having an acid number from 6.5 to 40.

A further aspect of the present invention is the reaction product of a member selected from the group consisting of glycerine and pentaerythritol and mixtures thereof, a member selected from the group consisting of stearic and oleic acid and mixtures thereof, and adipic acid wherein the reaction product has an acid number from 6.5 to 40.

Yet another version of the present invention is an intimate mixture comprising polyvinylchloride and the reaction product of a polyol with respect to the —OH groups, a monocarboxylic acid and a dicarboxylic acid with respect to the carboxylic groups wherein sufficient excess monocarboxylic or dicarboxylic acid is employed to give a reaction product having an acid number from 6.5 to 40.

The invention herein described also relates to a method of forming a low gloss and/or superior metal release property polyvinylchloride article including the steps of molding polyvinylchloride in the presence of a lubricating composition comprising the reaction product of a polyol with respect to the —OH groups and a dicarboxylic acid with respect to the carboxylic groups wherein sufficient excess dicarboxylic acid is employed such that the reaction product has free carboxylic groups and an acid number from 6.5 to 40.

DETAILED DESCRIPTION OF THE INVENTION

The polyols utilized in the present invention may be any material having more than one alcoholic hydroxyl group. In particular, the polyols utilized in the present invention will have from 2 to 6 hydroxyl groups and will further contain from 2 to 10 carbon atoms in the starting alcohol. The alcohols recommended herein include ethylene glycol, 1,2-propylene glycol, 1,3-propylene glycol, 1,4-butanediol, 2,3-butanediol, 1,5-pentanediol and 1,6 hexanediol. Various triols having from 3 to 10 carbon atoms may also be utilized herein such as glycerine or trimethylol propane. The tetrols utilized herein may be erythritol or pentaerythritol. The tetrols are the preferred material for manufacturing the reaction products of the present invention and in particular pentaerythritol is the preferred starting polyol.

The present invention also allows for the use of pentols having from 5 to 10 carbon atoms such as xylitol as well as hexols having from 6 to 10 carbon atoms such as mannitol, sorbitol or dipentaerythrite. Of the foregoing, several compounds are classified as sugars which are also generally useful herein provided they are polyol sugars without adverse functionality to the intended reaction products utility.

The second component to be discussed in the present invention is the dicarboxylic acid. The dicarboxylic acid is utilized to polymerize but not overly polymerize the polyol. That is the polymers of the present invention (reaction product) should not be over cross-linked. The polymers utilized in the present invention for the desired utility of metal release may be linear wherein a diol is utilized with a dicarboxylic acid. The present invention desires the presence of sufficient free acid groups on the reaction product molecule to ensure metal release as well as internal lubricity (without reducing internal lubricity).

To avoid the loss of the free acid groups the present invention as later described is essentially free of hydroxyl groups on the reaction product molecule. However, where the present invention allows the use of triols and higher polyols the potential exists for substantial cross-linking. For this reason, the higher polycarboxylic acids such as trimellitic acid are not utilized. That is if tricarboxylic acids or higher polycarboxylates are employed then substantial cross-linking and molecular weight build-up of the reaction product will occur without the corresponding benefit of metal release.

Suitable examples of dicarboxylic acids are those materials having from 2 to 22 carbon atoms which include saturated or unsaturated aliphatic hydrocarbon dicarboxylic acids having from 2 to 22 carbon atoms. In particular, alkanedioic acids are 2 to 22 carbon atoms, such as oxalic acid, malonic acid, succinic acid, glutaric acid, adipic acid, pimelic acid, suberic acid, azeleic acid, sebacic acid, nonanedioic acid, decanedioc acid, undecanedoic acid, eicosanedioic acid.

Further dicarboxylic acids useful herein include materials such as maleic acid, fumaric acid, citraconic acid, mesaconic acid and itaconic acid. Still further examples of dicarboxylic acids include the cycloaliphatic dicarboxylic acids of 5 to 10 carbon atoms. Such acids include the cycloalkanedioic acids such as cyclopropane-dicarboxylic acid, cyclobutane-dicarboxylic acid, cyclopentane-dicarboxylic acid, camphoric acid and an hexahydrophthalic acid.

Still further, dicarboxylic acids which may be utilized in the present invention include the aromatic hydrocarbon dicarboxylic acids of 8 to 12 carbon atoms such as the mononuclear aromatic dicarboxylic acids such as phthalic, terephthalic acid and isophthalic acid. Examples of dinuclear aromatic dicarboxylic acids such as naphthalic acid or diphenyl-o,o'-dicarboxylic acid.

A further important component in the practice of the present invention is the use of a monocarboxylic acid and in particular those having from 12 to 30 carbon atoms. Suitable examples of long-chained aliphatic monocarboxylic acids of from 12 to 30 carbon atoms include the alkanoic acids such as lauric acid, tridecylic acid, myristic acid, palmitic acid, margaric acid, stearic acid, archic acid, eicosanecarboxylic acid, behenic acid, lignoceric acid, cerotic acid, and the like. While various hydroxyalkanoic acids may be utilized it is desired to avoid such materials because the dual hydroxyl and carboxylic functionality allows excessive cross-linking of the molecules.

The polymer of choice for use with the reaction product of the present invention is polyvinylchloride. However, to some extent, the reaction product of the present invention is also useful with other polyvinylhalides, vinyl chloride-copolymers, polystyrene, polycarbonates, butadiene-styrene, isoprene-styrene, olefin-copolymers, acrylonitrilebutadiene-styrene; polyurethane; acrylate; methacrylate; polycarbonate and mixtures thereof.

The reaction products of the present invention are conveniently added at from 0.05 parts to 2 parts per 100 parts of the plastic requiring lubrication. The reaction product conveniently is added either as a solid mixture in the form of a powder or granules or as a liquid sprayed on the polyvinylchloride pellets prior to processing.

The reaction products of the present invention are generally prepared as follows. The polyol is typically reacted with a small amount of the mono-functional organic acid to add desired external lubricity through the long chain tail of the mono-functional organic acid. Thereafter, the dicarboxylic acid is introduced in an amount sufficient to essentially fully cross-link the hydroxyl groups of the polyols while leaving a free carboxylic group from the dicarboxylic acid in the reaction molecule. It is the free carboxylic acid within the reaction product molecule which accounts for the desirable non-stick metal release properties of the present invention.

The amount of the polyol, the monocarboxylic acid, and the dicarboxylic acid and may be calculated conveniently on a mole (or equivalent) basis. A preferred ratio of the components is where the mole ratio of the polyol as a tetrol to the monofunctional organic acid to the dicarboxylic acid is from 1:1.05:1.5 to 1:1.2:1.6; and when the polyol is triol is from 1:1.07:2 to 1:1.15:2.1; and when the polyol is a diol is from 1:1.09:1 to 1:1.17:1.1. Stated otherwise the acid number of the reaction product should be accounted for by the free carboxyl group on the reaction product and not the residual monocarboxylic acid or any free dicarboxylic acid.

Where the reaction is conducted without the monocarboxylic acid present the equivalent ratio of the polyol and the dicarboxylic acid is used to ensure that the reaction product has the requisite acid number obtained from the reaction product and not the free acid.

The polyvinylchloride may be further combined with a second resin selected from the group consisting of acrylonitrile-buta-diene-styrene; polyurethane; acrylic; methacrylic; polycarbonate and mixtures thereof. The mixed resin systems are useful for many of the same applications for which they are presently utilized. That is the lubricating effect of the lubricant of the present invention addresses the need of the polyvinylchloride without adversely affecting the resultant resin system.

The preferred process to obtain the reaction product is conducted by combining the monocarboxylic acid and the polyol in the appropriate amounts to obtain the desired end product with consideration of the dicarboxylic acid to be utilized, e.g. use the molar calculations to ensure that first reaction product can further react with the dicarboxylic acid.

The reaction product of the monocarboxylic acid, the dicarboxylic acid and the polyol may be conducted in a one step process but it is preferred top conduct that reaction sequentially.

The reaction conditions are favored by the application of heat and each esterification is conveniently conducted at from 50 Celsius up to the decomposition temperature of the lowest decomposing temperature of a reactant or product. Any excess reactant may be removed by conventional techniques.

The reaction product is desirably a liquid at 30 degrees Celsius. However the product is sufficiently stable to allow it to be melted and added to the resin prior to extrusion or other processing.

ADDITIONAL COMPONENTS

Typically, many additional components are utilized in polyvinylchloride processing. Generally, any of the normally used components in polyvinylchloride processing which do not materially interfere with the functioning of the lubricant system and the desired properties of low gloss and high impact resistance may be utilized herein.

For instance, an impact modifier such as Acryloid KM 334 available from Rohm & Haas may be utilized herein at from 1 to 10 weight parts per 100 parts of the polyvinylchloride resin. Fillers and pigments may also be utilized herein typically at from 3 to 20 weight parts per 100 parts of the polyvinylchloride resin.

Stabilizers may be utilized herein to neutralize the hydrochloric acid which is generated on degradation of the polyvinylchloride resin. Typically, the stabilizers may be various cadmium, lead, or tin compounds. A preferred tin stabilizer in the present invention is Advastab TM 181. The stabilizers are used in an amount sufficient to neutralize the acid formed upon degradation of the polyvinylchloride. Typically, the stabilizer will be used at 0.3 to 1.0 parts per 100 parts of the polyvinylchloride resin.

What follows are examples of the preparation of the reaction product of the present invention.

EXAMPLE I

A reactor is charged with five and one-tenth moles of stearic acid and five moles of glycerine. The reactor is heated to a temperature of 120 Celsius for a period of one hour.

Thereafter the reactor is charged with adipic acid in the amount of five moles over a time period of one and one half hours. The addition of the adipic acid is to add fifteen percent of the total amount every quarter hour and the last ten percent as the final increment.

The reaction mixture is then heated to 150 Celsius over a period of an additional one hour. The reaction vessel and the contents are then maintained at that temperature for an additional two and one-half hours at which time the reaction is substantially complete.

EXAMPLE II

A reactor is charged with seven and six-tenths moles of adipic acid and three moles of pentaerythritol. The reactor is heated to a temperature of 110 Celsius for a period of one hour.

The reaction mixture is then heated to 150 Celsius over a period of an additional one hour. The reaction vessel and the contents are then maintained at that temperature for an additional two and one-half hours at which time the reaction is substantially complete.

EXAMPLE III

A reactor is charged with thirteen moles of stearic acid and six moles of pentaerythritol. The reactor is heated to a temperature of 110 Celsius for a period of one hour.

To the foregoing mixture is added six moles of adipic acid. The reaction mixture is then heated to 150 Celsius over a period of an additional one hour. The reaction vessel and the contents are then maintained at that temperature for an additional two and one-half hours at which time the reaction is substantially complete.

EXAMPLE IV

A reactor is charged with one mole of oleic acid and one mole of ethylene glycol. The reactor is heated to a temperature of 120 Celsius for a period of one hour.

Thereafter the reactor is charged with a mixture of five moles of ethylene glycol and, adipic acid in the amount of six moles over a time period of one and one half hours. The addition of the adipic acid is to add fifteen percent of the total amount every quarter hour and the last ten percent as the final increment.

The reaction mixture is then heated to 150 Celsius over a period of an additional one hour. The reaction vessel and the contents are then maintained at that temperature for an additional two and one-half hours at which time the reaction is substantially complete.

EXAMPLE V

The reaction product of Example I is added to polyvinylchloride prior to mastication in a conventional extruder. The ratio of the reaction product to the polyvinylchloride is at one half part of the reaction product per one hundred parts of the polyvinylchloride.

Typically, the extruder will achieve a temperature of 140 to 220, preferably 150° to 200° C. during the extrusion process. No difficulty is observed in the extruder or in the shaped article obtained following the extrusion. The mixture of reaction product and the polyvinylchloride release easily from the extruder and from the mold used to obtain the shaped article.

EXAMPLE VI

The reaction product of Example II is added to polyvinylchloride prior to mastication in a conventional extruder. The ratio of the reaction product to the polyvinylchloride is at one half part of the reaction product per one hundred parts of the polyvinylchloride.

Typically, the extruder will achieve a temperature of 140° to 220°, preferably 150° to 200° C. during the extrusion process. No difficulty is observed in the extruder or in the shaped article obtained following the extrusion. The mixture of reaction product and the polyvinylchloride release easily from the extruder and from the mold used to obtain the shaped article.

EXAMPLE VII

The reaction product of Example III is added to polyvinylchloride prior to mastication in a conventional extruder. The ratio of the reaction product to the polyvinylchloride is at one half part of the reaction product per one hundred parts of the polyvinylchloride.

Typically, the extruder will achieve a temperature of 140° to 220°, preferably 150° to 200° C. during the extrusion process. No difficulty is observed in the extruder or in the shaped article obtained following the extrusion. The mixture of reaction product and the polyvinylchloride release easily from the extruder and from the mold used to obtain the shaped article.

EXAMPLE VIII

The reaction product of Example IV is added to polyvinylchloride prior to mastication in a conventional extruder. The ratio of the reaction product to the polyvinylchloride is at one half part of the reaction product per one hundred parts of the polyvinylchloride.

Typically, the extruder will achieve a temperature of 140° to 220°, preferably 150° to 200° C. during the extrusion process. No difficulty is observed in the extruder or in the shaped article obtained following the extrusion. The mixture of reaction product and the polyvinylchloride release easily from the extruder and from the mold used to obtain the shaped article.

What is claimed is:

1. An intimate mixture comprising polyvinylchloride and the reaction product of a polyol with respect to the —OH groups, a monocarboxylic acid and a dicarboxylic acid with respect to the carboxylic groups wherein sufficient excess dicarboxylic acid is employed to give a reaction product having an acid number from 6.5 to 40, provided further that the dicarboxylic acid cross-links the hydroxyl groups of the polyol while leaving a free carboxylic group from the dicarboxylic acid in the reaction molecule.

2. The reaction product of claim 1 wherein the mole ratio of the polyol as a tetrol to the monofunctional organic acid to the dicarboxylic acid is from 1:1.05:1.5 to 1:1.2:1.6; and when the polyol is triol is from 1:1.07:2 to 1:1.15:2.1; and when the polyol is a diol is from 1:1.09:1 to 1:1.17:1.1.

3. The reaction product of claim 1 wherein the dicarboxylic acid contains from 2 to 20 carbon atoms.

4. The reaction product of claim 1 wherein the polyol is a diol or triol.

5. The reaction product of claim 1 wherein the polyol is a tetrol.

6. The reaction product of claim 1 obtained from a mixture of glycerine, a member selected from the group consisting of stearic and oleic acid and mixtures thereof, and adipic acid.

7. The intimate mixture of claim 6 in the form of a shaped article.

8. The reaction product of claim 1 wherein the dicarboxylic acid is adipic acid.

9. The intimate mixture of claim 1 wherein the polyol contains from 3 to 21 carbon atoms.

10. The intimate mixture of claim 1 wherein the polyol is selected from the group consisting of ethylene glycol, propylene glycol, glycerine, pentaerythritol, and sugars.

11. The intimate mixture of claim 10 wherein the reaction product has an acid number from 8 to 38.

12. The intimate mixture of claim 10 wherein the base number of the reaction product is from 2 to 20.

13. The intimate mixture of claim 11 in the form of a shaped article.

14. The reaction product of claim 1 which is a liquid at 30 degrees Celsius.

15. The reaction product of claim 1 wherein the reaction product has an acid number from 8 to 36.

16. The reaction product of claim 1 obtained from the reaction mixture additionally comprising a monofunctional organic acid.

17. The reaction product of claim 1 wherein the monofunctional organic acid contains from 2 to 45 carbon atoms.

18. The reaction product of claim 1 wherein the reaction product has an average of 0.5 to 1 free carboxylic groups per molecule.

19. The reaction product of claim 1 wherein the reaction product has an average of at least 0.5 free carboxylic groups per molecule.

20. The reaction product of a member selected from the group consisting of glycerine and pentaerythritol, a member selected from the group consisting of stearic and oleic acid and mixtures thereof, and adipic acid wherein the reaction product has an acid number from 6.5 to 40.

21. The reaction product of claim 1 obtained from pentaerythritol.

22. The intimate mixture claim 9 wherein the reaction product is the reaction product of pentaerythritol, a member selected from the group consisting of stearic and oleic acid and mixtures thereof, and adipic acid wherein the adipic acid the reaction product has an acid number from 8 to 38.

* * * * *